United States Patent Office 3,793,400
Patented Feb. 19, 1974

3,793,400
POLYESTER-1,2 POLYBUTADIENE HIGH IMPACT MOLDING COMPOUND
Omer Eugene Curtis, Jr., Morristown, and Charles Driscoll Mason, Florham Park, N.J., assignors to Allied Chemical Corporation, New York, N.Y.
No Drawing. Filed Oct. 13, 1971, Ser. No. 189,005
Int. Cl. C08g 39/10, 51/04, 51/18
U.S. Cl. 260—862
14 Claims

ABSTRACT OF THE DISCLOSURE

The addition of certain 1,2-polybutadiene resins to unsaturated polyesters improves impact resistance and toughness with no loss of heat distortion temperature.

---

This invention relates to improved unsaturated polyester molding compositions. More particularly, this invention relates to certain unsaturated polyester molding compositions containing certain 1,2-polybutadiene resins which have improved impact resistance.

BACKGROUND OF THE INVENTION

Alkyd molding compositions are well known and are prepared from unsaturated polyesters of unsaturated aliphatic dibasic carboxylic acids and glycols admixed with fillers, lubricants, stabilizers, and peroxide curing agents. Alkyd molding compositions are inexpensive and can be readily fabricated by high speed, automatic equipment for a variety of products including automotive ignition components, switch gear components, and the like. However, alkyd resins have one disadvantage, inadequate toughness, which has limited their large scale use for example in the automotive industry, wherein molded parts must be able to withstand multi-step handling, machining, and processing with no long-term loss of strength. High performance plastics such as phenolics are presently preferred by the industry. However, phenolics have poor electrical properties, particularly at elevated temperatures, whereas alkyd resins have excellent electrical properties. Thus an alkyd resin having improved toughness would be highly desirable for molded parts for electrical and other components.

DISCUSSION OF THE PRIOR ART

The addition of a rubbery component to a thermoplastic resin to improve impact resistance and toughness is known, but addition of such materials to thermoplastic molding compositions does not always impart added toughness.

U.S. Pat. 3,231,634 to Wismer et al., teaches that unsaturated polyester resins can be modified by blending with a rubbery polymer to impart cracking resistance. The rubbery polymers added are polymers of conjugated dienes, such as butadiene, isoprene, haloprene, and copolymers thereof. However, the cured compositions of Wismer et al. exhibit a marked decrease in heat distortion temperature. This is unacceptable since the heat distortion temperature determines the temperature at which the composition can be molded without deformation of the article upon ejection from the mold. If the molding temperature is too low, the molding cycle time must be increased, with corresponding increase in cost. Further, the heat distortion temperature determines the temperature at which the mechanical and electrical properties of the cured resin deteriorate rapidly, thus defining its upper use temperature.

SUMMARY OF THE INVENTION

It is an object of the present invention to provide alkyd resin compositions having improved toughness.
It is a further object to provide molding compositions which can be formed and cured into tough molded articles having high heat distortion temperatures and excellent electrical properties.
Further objects will become apparent from the following detailed description thereof.

It has been discovered that molding compositions of certain unsaturated polyesters, containing certain 1,2-polybutadiene resins can be utilized in alkyd molding compositions which, when cured, exhibit greatly improved impact resistance and toughness and have high heat distortion temperatures.

The alkyd molding compositions of the invention are derived from an unsaturated polyester having a high fumarate functionality of at least about 55%, preferably 60–78%, by weight of the polyester, a glycol and optionally an aromatic dibasic carboxylic acid, admixed with from 3–20% by weight of the molding composition, preferably 5–15% by weight, of a 1,2-polybutadiene resin having a high 1,2-vinyl content of at least 70%, preferably 70–95% by weight of the butadiene polymer and conventional fillers, catalysts, inhibiters, and the like. Conventional cross-linking monomers containing a —$CH_2$=C< group can also be added.

DETAILED DESCRIPTION OF THE INVENTION

The unsaturated polyesters useful in the invention are the reaction products of fumaric and/or maleic acid or their anhydrides, with a glycol, and when required, also an aromatic dibasic acid.

The unsaturated polyesters must have a fumarate functionality, that is, the percentage by weight of unsaturated acid calculated as fumaric acid, of at least 55% and preferably from 60–78%. When the polyester has a high fumarate functionality, e.g., over about 75%, no aromatic dibasic acid need be added. When a lower functionality resin is desired, an amount of aromatic acid required to dilute the functionality to the desired level is also added.

Suitable aromatic dibasic acids include phthalic acid, isophthalic acid, terephthalic acid, trimellitic acid, and the like, or their anhydrides. Isophthalic acid is preferred for high impact materials.

Glycols suitable for preparing the polyesters include aliphatic diols such as ethylene glycol, propylene glycol, 1,2-, 1,3-, 1,4-butane diols, 1,6-hexane diol, diethylene glycol, triethylene glycol, dipropylene glycol, and the like; and aromatic diols, such as bis[4-(2-hydroxy)propoxyphenyl]dimethylmethane and the like. Mixtures of glycols can also be employed.

The unsaturated polyester generally contains an inhibiter to prevent premature curing or cross-linking. Suitable inhibiters are well known and include hydroquinone, mono-t-butylhydroquinone, t-butyl catechol, tetrachloroquinone, and the like.

The 1,2-polybutadienes suitable for use in the invention must have a 1,2-vinyl content of at least about 70%, preferably 70–95%, by weight of the resin. Polybutadienes having a molecular weight of about 100,000–300,000 are preferred in the invention. However, lower molecular weight resins having a molecular weight in the range 10,000–100,000, can also be employed when admixed, in amounts up to 50% by weight of the 1,2-polybutadiene, with 1,4-polybutadiene having a high molecular weight, i.e. over 100,000. However, the presence of excessive amounts of 1,4-polybutadiene has a deleterious effect on the heat distortion temperature of the resultant cured polyesters.

The molding compositions of the invention are prepared by admixing the unsaturated polyesters, the 1,2-polybutadiene resin (both as hereinabove described), and other conventional ingredients such as monomers, if employed, catalysts, fillers, and pigments.

The unsaturated polyesters are prepared in conventional manner as will be known to one skilled in the art. The manner and order of mixing of the ingredients of the present molding compositions are not critical and do not affect the properties of the resultant cured polymer.

Although a cross-linking monomer is not required to cure the molding compositions of the invention, a monomer can be added to aid in cross-linking the unsaturated polyesters as is known. The addition of a cross-linking monomer generally improves the melt flow and processability of the resin. Suitable monomers contain a $-CH_2=C<$ group and include styrene, ethyl-α-methylstyrene, chloro- and fluorostyrenes, vinyl toluene, divinyl benzene, diallyl maleate, methallyl maleate, allyl succinyl, allyl glycolate, bis(allyacetate)digycolate, diallyl phenyl phosphonate, diallyl phthalate, methyl methacrylate, propyl acrylate, butyl acrylate, vinyl acetate, allyl acetate, tris-(2-hydroxyethyl)isocyanurate, triallyl isocyanurate, triallyl cyanurate, diallyl itaconate, methylene bis(acrylamide) and the like. The cross-linking monomer is usually employed in amounts of up to 5% by weight of the mixture of polyester and monomer, preferably about 1–5% by weight. An excess of the monomer is undesirable since the resultant cured resins have lower impact strength.

Suitable catalysts for the molding compositions of the invention are also well known and include peroxides such as benzoyl peroxide, t-butyl perbenzoate, lauroyl peroxide, dicumyl peroxide, 2,5-dimethyl-2,5-bis(benzoylperoxy)hexane, isopropylbenzene hydroperoxide, methyl ethyl ketone peroxide, cyclohexanone peroxide, acetyl benzoyl peroxide, hydroxyheptyl peroxide, p-chlorobenzoyl peroxide, peracetic acid, acetyl peroxide, t-butyl peracetate and the like. The preferred catalysts are dicumyl peroxide and 2,5-dimethyl-2,5-bis(benzoylperoxy)hexane. Catalysts are generally employed in amounts of from 0.1 to 5% by weight of the unsaturated polyester. Mixtures of catalysts can also be employed.

The unsaturated polyester resins generally also contain inhibiters to improve shelf life. Illustrative of known inhibiters are t-butyl catechol, hydroquinone and t-butylhydroquinone.

Fillers suitable for preparation of the present molding compositions are well known and include organic and inorganic fillers such as α-cellulose, glass fibers, clay, asbestos, silica, calcium carbonate, zinc oxide, and the like.

Additional additives, including mold lubricants, such as zinc stearate, plasticizers, pigments, and dyes can also be added to the molding compositions in conventional manner, as will be known to one skilled in the art.

temperature (hereinafter HDT) according to ASTM test D648, Izod Impact according to ASTM test D256–56, and flexural strength and flexural modulus according to ASTM test D790.

The dropping ball impact test is carried out as follows: a 66.75 gm. ball is dropped onto molded 4 x ⅛" discs of the molding resin, initially from a height of 6 inches, and thereafter at two inch intervals more, until the disc cracks or breaks. Results are reported in inches corresponding to the height at which cracking or breaking occurs. This test is described in Canadian Pat. 759,096.

EXAMPLE 1

(A) Preparation of polyester

To a resin kettle fitted with a stirrer, gas inlet tube, thermometer and distillation column were added 2320 parts of fumaric acid, 664 parts of isophthalic acid, 1562 parts of ethylene glycol and 0.45 part of hydroquinone. The mixture was heated to 150° C. under nitrogen and, while stirring, the temperature was increased over a two hour period to 200° C. The temperature in the distillation column remained below 115° C. The distillation column was removed after one hour and heating continued for about 12 hours, or until the acid number was between 15 and 25 and a 50% solution of the resin in dimethylformamide had a Gardner-Holdt viscosity of L to O.

4.5 parts by volume of a 10% by weight solution of hydroquinone in propylene glycol was added and stirred for a few minutes. The resin was cooled to room temperature. The polyester contained 63% by weight of fumaric acid.

(B) Preparation of molding compound

Molding compositions were prepared by admixing the polyester as prepared above with a 1,2-polybutadiene resin having 70% of 1,2-vinyl content and a molecular weight of 250,000–300,000. The 1,2-polybutadiene was omitted from the control. The blends were admixed with about 75% of a calcium carbonate filler, about 0.25% of zinc stearate, about 1.25% of dicumyl peroxide, and about 0.001% of Lignocol, a phenolic inhibiter of Heyden Newport Chemical Corporation, and blended for ten minutes. The above proportions are percentages based on the total weight of the mixture. These blends were then passed through a heated roll mill (front roll 150° F., back roll 75° F.) a dozen times and formed into a ¼" thick sheet. The sheets were compression molded at 350° F. for five minutes at 10,000 p.s.i.g. Physical properties of the resultant blend are set forth below:

| Run number | Percent | | HDT, ° C. | Dropping ball impact, in. | Unnotched Izod impact, ft.-lbs. | Flexural | |
| | Polyester | 1,2-polybutadiene | | | | Strength, p.s.i. | Modulus, p.s.i. ×10⁻⁴ |
| --- | --- | --- | --- | --- | --- | --- | --- |
| 1 | 25 | 0 | >220 | 14 | 1.15 | 11,400 | 223 |
| 2 | 20 | 5.0 | >220 | 19 | 1.32 | 10,600 | 209 |
| 3 | 16.7 | 8.3 | >220 | 23 | 1.41 | 11,700 | 176 |
| 4 | 12.5 | 12.5 | >220 | 27 | 1.60 | 12,400 | 143 |

The invention will be further illustrated by the following examples, but it is to be understood that the invention is not meant to be limited to the details described therein. In the examples all parts and percentages are by weight unless otherwise noted. Gardner-Holdt viscosity was determined according to ASTM test D154–64, acid number according to ASTM test D1639–61, heat distortion It is apparent that the addition of 1,2-polybutadiene greatly improves the impact resistance of the alkyd molding resin with no decrease in flexural strength, while retaining a high heat distortion temperature.

The molding compositions of the invention also produce articles having improved electrical properties as shown by the following results:

|  | Run 1 | Run 2 | Run 3 | Run 4 |
|---|---|---|---|---|
| Room temperature (RT): Dielectric constant (DC)/Dissipation factor (DF): | | | | |
| 60 Hz | 5.99/.0072 | 5.73/.0050 | 5.47/.0053 | 5.16/.0065 |
| 1 kHz | 5.90/.0064 | 5.69/.0051 | 5.43/.0059 | 5.14/.0051 |
| 1 mHz | | 5.89/.0078 | 5.64/.0070 | 5.28/.0056 |
| 175° C.: Dielectric constant (DC)/Dissipation factor (DF): | | | | |
| 60 Hz | 8.99/.142 | 7.86/.191 | 7.55/.190 | 6.58/.129 |
| 1 kHz | 8.11/.0477 | 7.13/.0296 | 6.76/.0323 | 6.12/.0211 |
| 1 mHz | | 6.71/.0143 | 6.35/.0118 | 5.76/.0084 |
| Percent change of RT, DC at 175° C.: | | | | |
| 60 Hz | 50 | 35 | 37 | 30 |
| 1 kHz | 37 | 25 | 25 | 20 |
| 1 mHz | | 15 | 11 | 10 |
| Percent change of RT, DF at 175° C.: | | | | |
| 60 Hz | (1,900) | 2,800 | 2,800 | 1,750 |
| 1 kHz | 645 | 480 | 420 | 200 |
| 1 mHz | | 80 | 69 | 33 |

EXAMPLE 2

The procedure of Example 1, Run 4 was followed except substituting for the filler 75% by weight of the molding composition of silica and 0.3% of gamma-methacryloxypropyltrimethoxysilane.

Dropping ball impact was 20 in. and HDT was 220° C.

EXAMPLE 3

The procedure of Example 1, Run 4 was followed except substituting for the polyester a polyester derived from 11.7 mols of maleic anhydride, 3.0 mols of phthalic anhydride, 13.6 mols of ethylene glycol and 2.0 mols of propylene glycol. This polyester has a calculated fumarate functionality of 58%.

Dropping ball impact was 18 in., flexural strength 11,260 p.s.i., flexural modulus 142×10⁻⁴ p.s.i. and HDT 142° C.

EXAMPLE 4

The procedure of Example 1, Run 4 was followed except substituting for the polyester a polyester derived from maleic anhydride and ethylene glycol having a fumarate functionality of 77.5%.

Dropping ball impact was 24 in.

EXAMPLE 5

The procedure of Example 1 was followed except substituting for the fumarate polyester a polyester of maleic anhydride, isophthalic acid and ethylene glycol, having a calculated fumarate functionality of 63%. Results are given below:

| Polyester, percent | 1,2-poly-butadiene, percent | HDT, °C. | Dropping ball impact, in. | Flexural Strength, p.s.i. | Flexural Modulus, p.s.i. ×10⁻⁴ |
|---|---|---|---|---|---|
| 25 | 0 | 216 | 13 | 11,700 | 220 |
| 20 | 5.0 | 215 | 18 | 11,700 | 192 |
| 16.7 | 8.3 | 185 | 17 | 11,500 | 157 |
| 12.5 | 12.5 | 185 | 23 | 9,000 | 133 |

EXAMPLE 6

As a comparison the procedure of Example 1, Run 4 was followed except substituting a polyester having a fumarate functionality of only 47%.

Dropping ball impact was only 14 in.

EXAMPLE 7

The procedure of Example 1 was followed except substituting for the 1,2-polybutadiene resin a 1,2-polybutadiene polymer having a molecular weight of only 13,000.

Results are summarized below:

| Polyester, percent | 1,2-poly-butadiene, percent | HDT, °C. | Dropping ball impact, in. | Flexural Strength, p.s.i. | Flexural Modulus, p.s.i. ×10⁻⁴ |
|---|---|---|---|---|---|
| 22.5 | 2.5 | 220 | 16 | 12,200 | 192 |
| 16.7 | 8.3 | 216 | 14 | 9,800 | 184 |
| 12.5 | 12.5 | 215 | 15 | 8,500 | 154 |

Thus, improvement in impact strength is not obtained using low molecular weight polybutadienes alone. However, improved impact can be obtained by addition of higher molecular weight polybutadiene, as is apparent from the results given below:

| Polyester, percent | 1,2-poly-butadiene, percent | 1,4-poly-butadiene, percent | HDT, °C. | Dropping ball impact, in. | Flexural Strength, p.s.i. | Flexural Modulus, p.s.i. ×10⁻⁴ |
|---|---|---|---|---|---|---|
| 12.5 | 9.4 | 3.1 | 220 | 21 | | |
| 12.5 | 6.2 | 6.2 | 204 | 25 | 9,150 | 129 |
| 12.5 | 3.1 | 9.4 | 115 | 33 | | |
| 12.5 | | 12.5 | 116 | 29 | | |

We claim:

1. An alkyd molding composition comprising an unsaturated polyester derived from a dibasic aliphatic acid selected from the group consisting of fumaric acid, maleic acid or their anhydrides and a glycol, the polyester having a fumarate functionality of from 55 to about 78% by weight of the polyester, and from 3 to about 20% by weight of the molding composition of polybutadiene which is a polybutadiene having a 1,2-vinyl content of at least about 70% and a molecular weight of from about 100,000 to about 300,000, or a blend of 1,2-polybutadiene having a 1,2-vinyl content of at least about 70% and a molecular weight of from about 10,000 to about 100,000 with up to an equal amount of 1,4-polybutadiene having a molecular weight over 100,000.

2. A composition according to claim 1 wherein the polyester has a fumarate functionality of 60–78% by weight of the polyester.

3. A composition according to claim 1 wherein the polyester is derived from fumaric acid or maleic anhydride, an aromatic dibasic acid, and one or more glycols.

4. A composition according to claim 1 wherein the polybutadiene is a polybutadiene having a 1,2-vinyl content of at least about 70% and a molecular weight of from about 100,000 to about 300,000.

5. A composition according to claim 1 wherein the polybutadiene is a blend of 1,2-polybutadiene having a 1,2-vinyl content of at least about 70% and a molecular weight from about 10,000 to about 100,000 with up to an equal amount of a 1,4-polybutadiene having a molecular weight over 100,000.

6. A composition according to claim 1 additionally containing a filler.

7. A composition according to claim 1 additionally containing up to 5% by weight of the total composition of a monomer having a —$CH_2$=C< group.

8. A high impact alkyd molding composition comprising an unsaturated polyester derived from an aliphatic dibasic acid selected from the group consisting of fumaric acid, maleic acid or their anhydrides, a glycol and an aromatic dibasic acid, the polyester having a fumarate functionality of from 55 to about 78% by weight of the polyester and from about 5 to about 15% by weight of the molding composition of a 1,2-polybutadiene having a 1,2-vinyl content of from 70 to 95% by weight of the polybutadiene polymer and a molecular weight of from about 100,000 to about 300,000.

9. A composition according to claim 8 wherein the aromatic dibasic acid is isophthalic acid.

10. A composition according to claim 8 wherein the polyester has a fumarate functionality of at least about 60%.

11. A composition according to claim 8 additionally containing a filler.

12. A molded article of the composition of claim 1.
13. A molded article of the composition of claim 5.
14. A molded article of the composition of claim 8.

References Cited

UNITED STATES PATENTS

| | | | |
|---|---|---|---|
| 3,577,478 | 5/1971 | Thorpe | 260—862 |
| 3,714,110 | 1/1973 | Verdol et al. | |
| 3,733,370 | 5/1973 | Thompson et al. | |
| 3,564,077 | 2/1971 | Brinkman et al. | 260—873 |
| 3,598,882 | 8/1971 | Brinkman et al. | 260—873 |
| 2,609,353 | 9/1952 | Rubens | 260—862 |
| 2,631,175 | 3/1953 | Crouch | 260—669 |
| 3,231,634 | 1/1966 | Wismer | 260—862 |
| 3,518,213 | 6/1970 | Miyoshi | 260—862 |
| 3,620,900 | 11/1971 | Willinger | 161—162 |

OTHER REFERENCES

Kennedy and Torquist, "Polymer Chemistry of Synthetic Elastomers," Part II, vol. XXIII, Interscience, 1969, pp. 491 and 564–71.

WILLIAM H. SHORT, Primary Examiner

E. WOODBERRY, Assistant Examiner

U.S. Cl. X.R.

260—9, 40 R, 873